US010999963B2

(12) United States Patent
Andrews

(10) Patent No.: US 10,999,963 B2
(45) Date of Patent: May 11, 2021

(54) WEED REMOVAL TOOL

(71) Applicant: Yvonne Andrews, Council Bluffs, IA (US)

(72) Inventor: Yvonne Andrews, Council Bluffs, IA (US)

(*) Notice: Subject to any disclaimer, the term of this patent is extended or adjusted under 35 U.S.C. 154(b) by 67 days.

(21) Appl. No.: 16/220,641

(22) Filed: Dec. 14, 2018

(65) Prior Publication Data

US 2020/0187404 A1 Jun. 18, 2020

(51) Int. Cl.
*A01B 1/18* (2006.01)

(52) U.S. Cl.
CPC ..................... *A01B 1/18* (2013.01)

(58) Field of Classification Search
CPC ..................................................... A01B 1/18
USPC ........................................ 294/49, 55.5, 50.6
See application file for complete search history.

(56) References Cited

U.S. PATENT DOCUMENTS

| 2,437,393 | A | * | 3/1948 | Kramer | A01B 1/16 |
| | | | | | 294/50.6 |
| 3,777,708 | A | * | 12/1973 | Vogt | A01K 23/005 |
| | | | | | 294/1.5 |
| 5,234,241 | A | | 8/1993 | Ikerd | |
| 5,456,449 | A | | 10/1995 | Smith | |
| 5,779,290 | A | * | 7/1998 | Wilke | A01K 23/005 |
| | | | | | 294/1.5 |
| D453,450 | S | * | 2/2002 | Drummond | D7/693 |
| 7,451,832 | B1 | | 11/2008 | Delvo | |
| 8,287,014 | B2 | | 10/2012 | Combe | |

* cited by examiner

*Primary Examiner* — Paul T Chin
(74) *Attorney, Agent, or Firm* — Baird Holm LLP

(57) ABSTRACT

A weed removal tool removes weeds, including substantially all of the weed's root structure, by applying consistent pressure to the weed and the weed's root structure. The weed removal tool includes a loop formed from loop material and comprising a degree of partial twist, a handle, an attachment means for securing the loop to the handle, and a removable attachment. The degree of partial twist corresponds to the ratio of the length of the loop material to the thickness of the loop material. A method of removing a weed using the weed removal tool includes engaging the weed with the loop of the weed removal tool, digging into the soil adjacent to a root structure of the weed, and removing the root structure of the weed.

11 Claims, 6 Drawing Sheets

WEED REMOVAL TOOL

BACKGROUND

Unwanted weeds are a common plight to lawns, farms, and gardens. When an unwanted weed grows among desired plants, flowers, or crops, the weed may interfere with the aesthetic appearance of the lawn, farm, or garden, and may compete with the desired plants, flowers, or crops so as to deprive them of necessary resources, such as sunlight, soil nutrients, water, and growth space.

Removal of weeds is accomplished by conventional apparatus and methods to avoid the results of unwanted weeds noted in the first paragraph. The conventional methods of removing weeds include manual removal by hand and removal with a conventional device, such as a hoe or spade.

Manual removal of weeds is often ineffective as it commonly results in improper removal of root structures from the soil (e.g. under the surface of the ground), such that only a portion of the weed is removed. Partial removal increases the likelihood that the weed will return or spread. Further, removal of weeds by hand often requires a person to continuously bend over, which may cause stress on the person's back, result in injury, or cause fatigue. Further still, removal of weeds by hand often requires a person to position his or her hands and knees on the ground, thereby exposing himself or herself to dirty areas.

Removal of weeds through the use of conventional devices often causes disruption of a larger area of the lawn, farm, or garden than is necessary to remove the weed. For example, when using a conventional device to remove weeds, a person will use such a device to break up the soil around the weed. Because weeds generally occupy a much smaller area of the soil than is disturbed through the use of the tool, the removal process can result in cosmetic blemishes to the lawn, farm, or garden. Moreover, in areas where the desired vegetation is dense, use of a conventional device to remove weeds may also cause removal of substantial portions of the desired plants due to the proximity of the roots of the weed to desired plants.

Finally, removal of weeds with a conventional device often requires more than one insertion of the device into the soil, and some weeds may require several insertions into the soil surrounding the weed. The time required to remove a weed increases with each insertion of the conventional device into the soil.

It is, therefore, desirable to have a weed removal tool that removes substantially all of the weed, including root structures below the surface, such that the weed will not grow back from the same root structure. It is further desirable that the weed removal tool provide targeted removal of the entire weed, disrupting only a small area of soil surrounding the weed. Finally, it is desirable to have a weed removal tool that reduces the amount of time required to remove a weed.

FIGURES

SUMMARY

In one aspect, a weed removal tool includes a loop formed from a single length of loop material, wherein the loop has a degree of partial twist corresponding to the ratio of the length of the loop to the thickness of the loop material; a handle comprising a tube element, a loop end, and an attachment end, wherein the loop is in mechanical communication with the loop end of the handle; and a removable attachment, wherein the removable attachment is removably secured to the handle at the attachment end.

In another aspect, the weed removal tool includes a loop formed from a single length of loop material, wherein the loop is from 76.2 millimeters to 177.8 millimeters long, and from 25.4 millimeters to 101.6 millimeters wide, and wherein the loop material is from 1.83 millimeters to 4.06 millimeters thick, and wherein the loop comprises a degree of partial twist corresponding to the ratio of the length of the loop to the thickness of the loop material, and wherein the ratio is from 48.1:1 to 31.2:1; a handle comprising a tube element, a loop end, and an attachment end; an attachment means for securing the loop to the handle at the loop end; and a removable attachment, wherein the removable attachment is removably secured to the handle at the attachment end, and wherein the removable attachment is selected from the group consisting of a trowel, a rake, a loop, and another garden tool.

In another aspect, a method of removing a weed using a weed removal tool includes engaging the weed with a loop of the weed removal tool; digging into the soil adjacent to a root structure of the weed; and removing the root structure of the weed.

DETAILED DESCRIPTION

A weed removal tool includes a loop, an attachment means, and a handle. The handle of the weed removal tool may include one or more removable attachments. The weed removal tool removes weeds, including substantially all of the weed's root structure, by applying consistent pressure to the weed and the weed's root structure.

Figure 2:
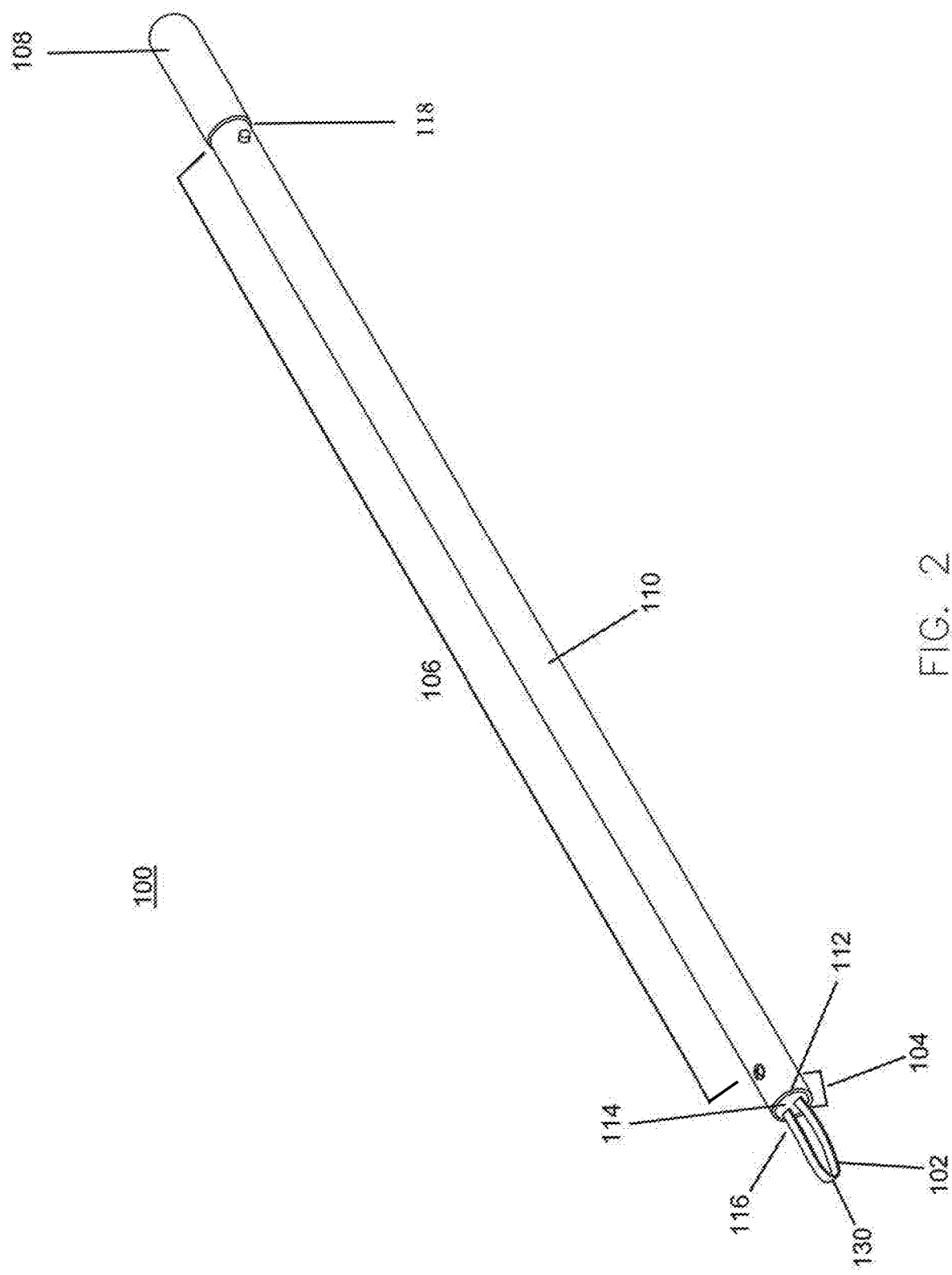
FIG. 2 illustrates a perspective view of the weed removal tool.

FIG. 2 is a perspective view of a weed removal tool 100. The weed removal tool 100 includes a loop 102, an attachment means 104, and a handle 106. The weed removal tool may include a removable attachment 108 (see FIG. 7).

The loop 102 of the weed removal tool 100 substantially removes a weed and the weed's root structure during use. The loop 102 is a continuous piece of material made from a loop material with flexible rigidity, where the flexible rigidity provides sufficient rigidity to remove substantially all of the root structure with sufficient flexibility to avoid the loop tearing or cutting through the weed or the weed's root structure. Further, the flexible rigidity substantially removes the root structure without disturbing a significant area of soil around the weed (e.g. does not substantially interfere with other plant structures).

The loop material of the loop 102 may be metal, plastic, fiber, rubber, polymer, or combinations thereof. Preferably, the loop material is made from a non-corrosive metal, such as spring steel, stainless steel, nickel, titanium, cobalt, gold, silver, or a combination thereof. Most preferably, the loop material of the loop 102 is stainless steel. The loop material has a width from 0.5 millimeters to 3.0 millimeters. The loop material has a thickness from 1.83 millimeters to 4.06 millimeters (15 to 8 standard wire gauge, respectively).

The loop 102 is from 76.2 millimeters to 177.8 millimeters (3.00 inches to 7.00 inches) long, as measured from the furthest points of the loop 102. The loop 102 is from 25.4 millimeters to 101.6 millimeters (1.00 inches to 4.00 inches) wide, as measured from the widest points of the loop 102.

The loop 102 is an oblong shape having a partial twist at an apex 130, where the partial twist is formed by the insertion of each end of the loop into the handle 106 such that the ends of the loop are positioned to be aligned along a same x-axis. The degree of partial twist corresponds to the length of the loop and the thickness (e.g. gauge) of the loop material. Preferably, the ratio of the length of the loop to the thickness of the loop material is from 48.1:1 to 31.2:1. For example, when the loop 102 is 127.0 millimeters (5.00 inches) in length, the thickness of the loop material may be from 2.64 millimeters to 4.06 millimeters (12 to 8 standard wire gauge), yielding a ratio from 48.1:1 to 31.3:1.

The handle 106 includes a tube element 110 that defines an interior channel 112. The tube element 110 includes a loop end 116 and an attachment end 118. The tube element 110 may include two or more pieces. When the tube element 110 contains two or more pieces, said pieces may be removably coupled by a depressible button attachment, such as using the mechanism of FIG. 7. The tube element 110 is made from a rigid material, such as metal, plastic, polymer, composite (e.g., fiberglass), or a combination thereof. The tube element 110 may be substantially hollow. The tube element 110 may be substantially solid.

The handle 106 may be of such a length that a person may use the weed removal tool 100 while standing upright or while crouching or bending. More specifically, the handle is of such a length that the length of the weed removal tool 100, measured from its two furthest points, may range from 355.6 millimeters to 1270.0 millimeters (14.00 inches to 50.00 inches).

The loop 102 is in mechanical communication with the handle 106 at the loop end 116 via the attachment means 104. The attachment means 104 may include an adhesive or mechanical attachment to secure the loop 102 to the handle 106 at the loop end 116, as further described in FIGS. 5, 6, and 8.

Figure 7:
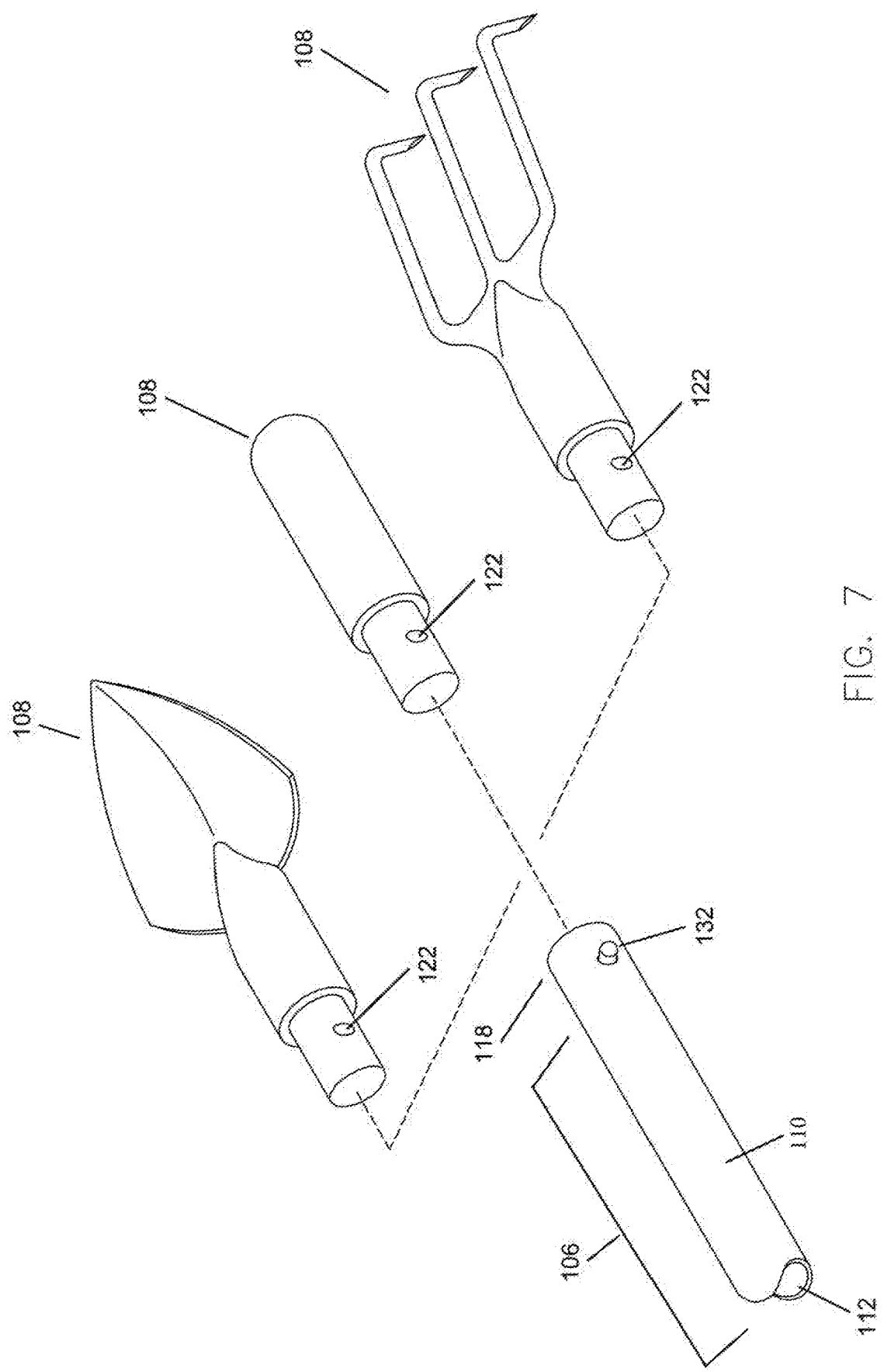
FIG. 7 illustrates one or more removable attachments to a handle.

FIG. 7 illustrates the one or more removable attachments 108. The one or more removable attachments 108 are in removable communication with the attachment end 118 of the handle 106. The one or more removable attachments 108 may be in removable communication with the attachment end 118 via an attachment aperture 122 and a depressible button 132, where when the depressible button 132 is depressed it allows the one or more removable attachments to be received by the attachment end 118. Upon reception of the one or more removable attachments 108, the depressible button 132 un-depresses through the attachment aperture 122, securing the one or more removable attachments 108 to the handle 106. The one or more removable attachments 108 may be a trowel, a rake, an additional loop, or other garden device.

Figure 3:
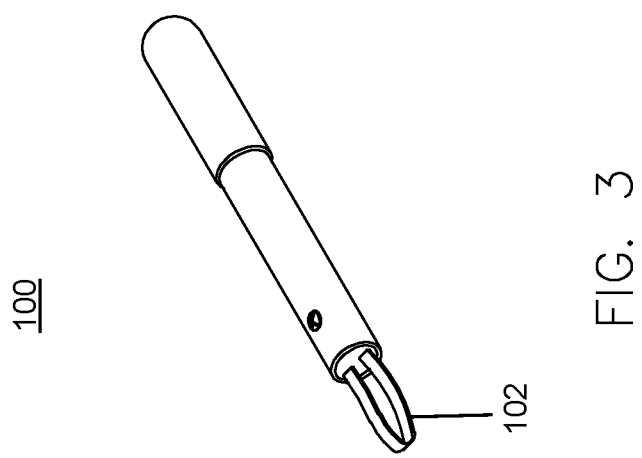
FIG. 3 illustrates the weed removal tool having a loop small in size.
Figure 4:
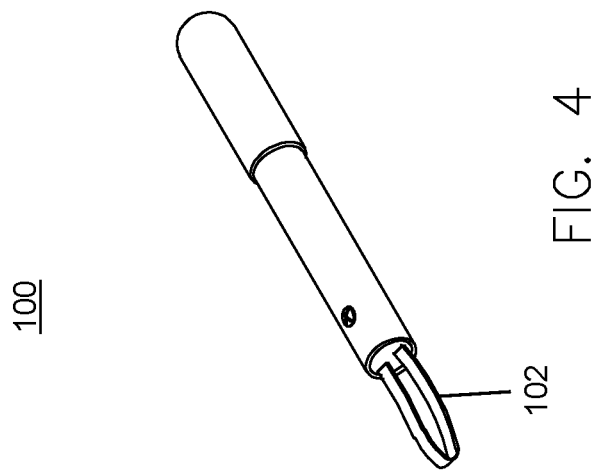
FIG. 4 illustrates the weed removal tool having a loop large in size.

FIG. 3 illustrates the weed removal tool 100 wherein the loop 102 is small in size, where a loop small in size is from 76.2 millimeters to 127.0 millimeters (3.00 inches to 5.00 inches) long, as measured from the two furthest points of the loop 102. FIG. 4 illustrates the weed removal tool 100 wherein the loop 102 is large in size, where a loop large in size is from 127.0 millimeters to 177.8 millimeters (5.00 inches to 7.00 inches) long, as measured from the two furthest points of the loop 102.

Figure 5:
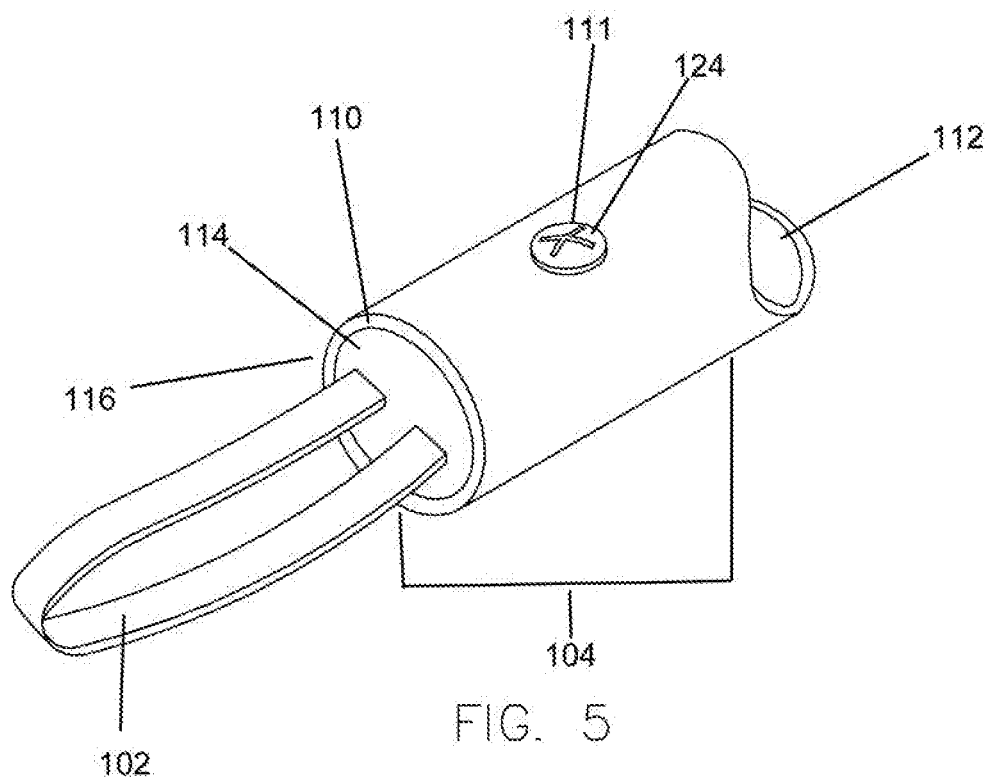
FIG. 5 illustrates an attachment means of a loop to a handle.
Figure 6:
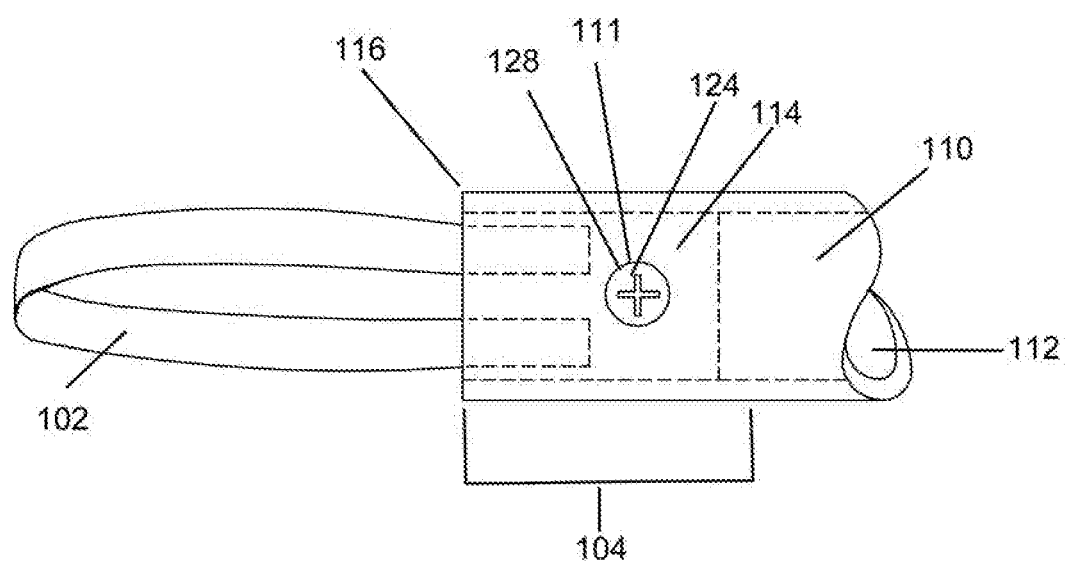
FIG. 6 illustrates the attachment means of a loop to a handle.

FIG. 5 and FIG. 6 illustrate the attachment means 104, where the attachment means is a solid insert 114. The loop 102 is secured to the solid insert 114, such as through adhesive. The solid insert 114 may include two slits aligned along an x-axis, each for securing one end of the loop 102. The solid insert 114 is made of a material that is solid, such as metal, plastic, polymer, composite, or a combination thereof. The solid insert 114 is from 25.4 millimeters to 152.4 millimeters (1.00 inches to 6.00 inches) in length.

The solid insert 114 may be removably secured to the loop end 116 of the handle. The solid insert 114 may be removably secured to the loop end 116 via a screw 124, where the solid insert is received by the interior channel 112. The solid insert 114 may include a screw aperture 128 configured to receive the screw 124. There may be a loop screw aperture 111 at the loop end 116 configured to receive the screw 124. The solid insert 114 may be removably secured to the loop end 116 via a depressible button attachment, such as using the mechanism of FIG. 7.

Figure 8:
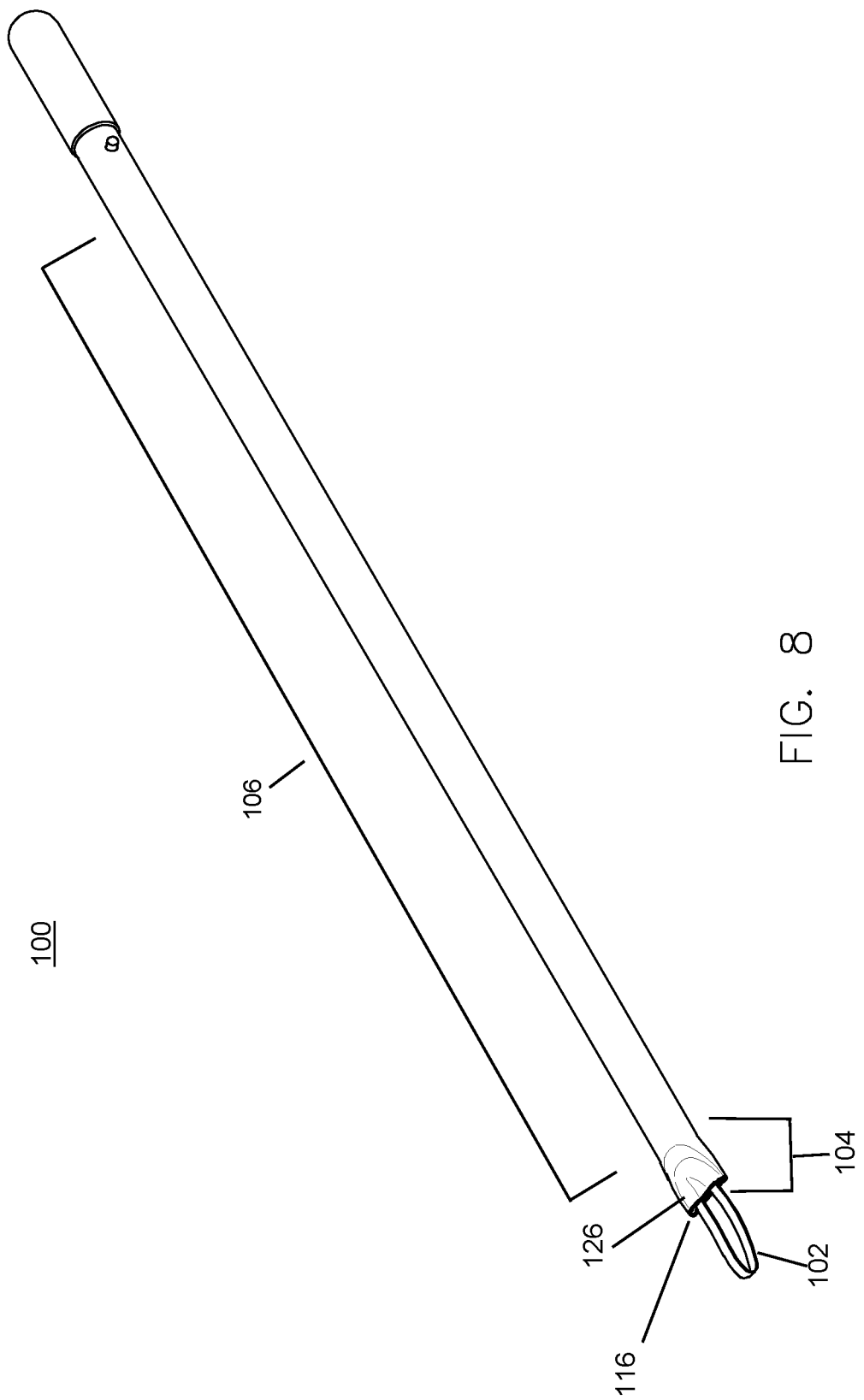
FIG. 8 illustrates the attachment means for the loop to the handle.

FIG. 8 illustrates the attachment means 104, where the attachment means is a crimp seal 126. The loop 102 is secured to the handle 106 at the loop end 116 via the crimp seal 126. The crimp seal 126 is formed by the application of a force to the loop end 116 to crimp the loop end 116, which secures the loop 102 to the handle 106.

Figure 1:
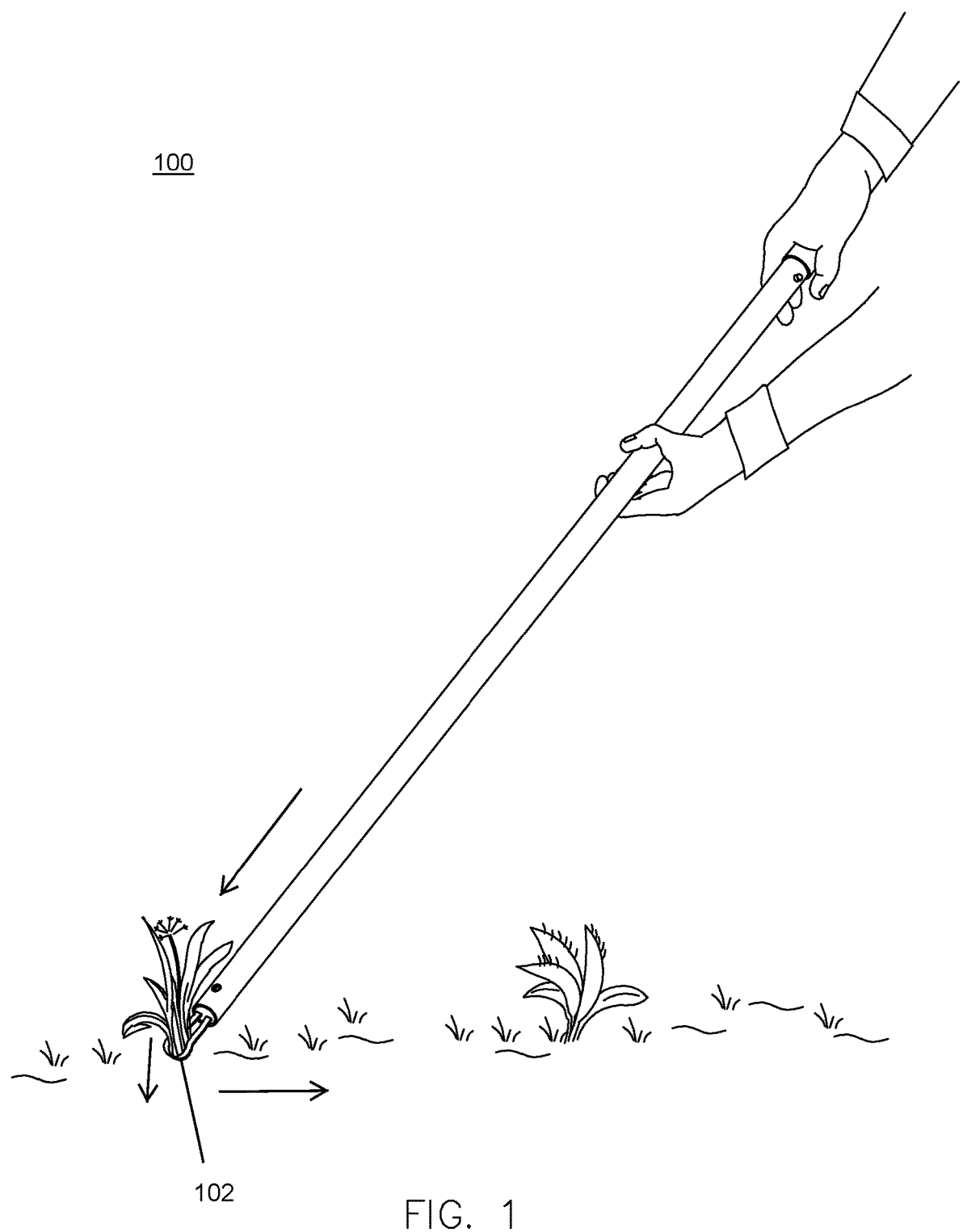
FIG. 1 illustrates a method of removing a weed using the weed removal tool.

FIG. 1 illustrates a method of removing a weed, including substantially all of the weed's root structure, with minimal disruption of the surrounding soil using the weed removal tool 100. A user may use the weed removal tool 100 while standing, crouching, or bending. The user may employ the weed removal tool 100 by engaging a weed with the loop 102. The engaging may include contacting the loop 102 to the soil adjacent to the weed. The engaging may further include inserting the weed through the loop 102.

After engaging the weed, the loop 102 of the weed removal tool 100 is dug into the soil adjacent to the root structure of the weed. The loop 102 of the weed removal tool 100 then removes the root structure of the weed from the soil. The removing may include the user applying a pulling force to pull the root structure from the soil. The removing may further include the user applying a pulling force while moving the loop 102 side-to-side to removing the root structure from the soil. The method of removing a weed using the weed removal tool takes from 3 to 15 seconds, depending on the moisture of the soil, the size of the weed, and the weed's root structure.

The invention claimed is:

1. A weed removal tool comprising:
   a loop formed from a single length of loop material, wherein
     the loop has a degree of partial twist, said degree of partial twist corresponding to a ratio of a length of the loop to a thickness of the loop material;
   a handle, said handle comprising a tube element, a loop end, and an attachment end, wherein
     the loop is in mechanical communication with the loop end of the handle; and
   a removable attachment, wherein
     the removable attachment is removably secured to the handle at the attachment end; and
   a solid insert, the solid insert removably secured to the handle, where the solid insert is made from a solid material having two slits aligned along an x-axis, and wherein the solid material is selected from the group consisting of metal, plastic, polymer, composite, and combinations thereof, and wherein the loop is secured to the solid insert, where each end of the loop is secured in the slits with an adhesive; and the loop is in mechanical communication with the handle via the solid insert.

2. The weed removal tool of claim 1, wherein
the loop is from 76.2 millimeters to 177.8 millimeters long and from 25.4 millimeters to 101.6 millimeters wide.

3. The weed removal tool of claim 1, wherein
the loop material is a material selected from the group consisting of metal, plastic, rubber, polymer, and combinations thereof.

4. The weed removal tool of claim 3, wherein
the loop material is from 1.83 millimeters to 4.06 millimeters thick.

5. The weed removal tool of claim 1, wherein
the ratio is from 48.1:1 to 31.3:1.

6. The weed removal tool of claim 1, wherein
a length of the weed removal tool is from 355.6 millimeters to 1270.0 millimeters.

7. The weed removal tool of claim 6, wherein the handle is two or more pieces, wherein the two or more pieces are removably coupled by a depressible button attachment.

8. The weed removal tool of claim 6, wherein the loop is in mechanical communication with the handle via a crimp seal.

9. The weed removal tool of claim 1, wherein the solid insert is removably coupled with the handle via a depressible button attachment.

10. The weed removal tool of claim 1, wherein the solid insert is removably secured with the handle via a screw.

11. A weed removal tool comprising:
a loop formed from a single length of loop material, wherein
the loop is from 76.2 millimeters to 177.8 millimeters long and from 25.4 millimeters to 101.6 millimeters wide, and wherein
the loop material is from 1.83 millimeters to 4.06 millimeters thick, and
wherein
the loop comprises a degree of partial twist, said degree of partial twist corresponding to a ratio of the length of the loop to the thickness of the loop material, and wherein
said ratio is from 48.1:1 to 31.3:1;
a handle, said handle comprising a tube element, a loop end, and an attachment end;
an attachment means for securing the loop to the handle at the loop end to form the degree of partial twist in the loop and
a removable attachment, wherein
the removable attachment is removably secured to the handle at the attachment end, and wherein
the removable attachment is selected from the group consisting of a trowel, a rake, a loop, and another garden tool.

* * * * *